(12) United States Patent
Zider

(10) Patent No.: US 8,622,541 B2
(45) Date of Patent: Jan. 7, 2014

(54) EYEGLASS FRAMES

(76) Inventor: Robert B. Zider, Portola Valley, CA (US)

( * ) Notice: Subject to any disclaimer, the term of this patent is extended or adjusted under 35 U.S.C. 154(b) by 0 days.

(21) Appl. No.: 13/199,896

(22) Filed: Sep. 12, 2011

(65) Prior Publication Data

US 2013/0063694 A1  Mar. 14, 2013

(51) Int. Cl.
*G02C 5/14* (2006.01)
*G02C 1/02* (2006.01)

(52) U.S. Cl.
CPC ............... *G02C 5/146* (2013.01); *G02C 1/023* (2013.01)
USPC ............... 351/111; 351/110; 351/142

(58) Field of Classification Search
CPC .................. G02C 5/146; G02C 1/023
USPC .................... 351/103–123, 142, 154
See application file for complete search history.

(56) References Cited

U.S. PATENT DOCUMENTS

| 2,851,925 | A |   | 9/1958 | Cretin-Martenaz |
|---|---|---|---|---|
| 3,824,006 | A |   | 7/1974 | Volt |
| 4,895,438 | A |   | 1/1990 | Zider |
| 4,896,955 | A |   | 1/1990 | Zider |
| 5,189,447 | A | * | 2/1993 | Oleson ............ 351/121 |
| 5,452,028 | A |   | 9/1995 | Iijima |
| 5,640,217 | A |   | 6/1997 | Hautcoeur |
| 5,805,259 | A |   | 9/1998 | Chao |
| 5,861,933 | A |   | 1/1999 | Bac |
| 6,164,775 | A |   | 12/2000 | Zider |
| 6,250,755 | B1 |   | 6/2001 | Conner |
| 6,394,599 | B1 |   | 5/2002 | Blanvillain |
| 6,523,952 | B1 | * | 2/2003 | Krumme ............ 351/110 |
| 6,752,893 | B2 |   | 6/2004 | Frieder |
| 6,805,441 | B1 |   | 10/2004 | Loniak |
| 6,827,439 | B1 |   | 12/2004 | Chen |
| 6,843,561 | B2 |   | 1/2005 | Krumme |
| 7,066,594 | B2 |   | 6/2006 | Loniak |
| 7,588,331 | B2 | * | 9/2009 | Burnstein ............ 351/51 |
| 2005/0139309 | A1 |   | 6/2005 | Savoie |
| 2005/0157253 | A1 |   | 7/2005 | Thiele |
| 2005/0253999 | A1 |   | 11/2005 | Lerner |
| 2006/0082722 | A1 |   | 4/2006 | Rapp |
| 2006/0139565 | A1 |   | 6/2006 | Jannard |

(Continued)

FOREIGN PATENT DOCUMENTS

| DE | 212187 | 7/1909 |
|---|---|---|
| DE | 213310 | 9/1909 |

(Continued)

OTHER PUBLICATIONS

Korean Patent Office Search Report and Opinion for PCT/US 2009/005202.

(Continued)

*Primary Examiner* — Huy K Mai
(74) *Attorney, Agent, or Firm* — T. H. P. Richardson

(57) ABSTRACT

A pair of spectacles which comprises (A) a pair of lenses, each lens having an engaging portion on its periphery, and (B) a pair of temple arms, each of which comprises (1) a side member, (2) an auxiliary member, and (3) a return member which comprises an attachment portion fitted to an engaging portion of a lens; the auxiliary member (i) being connected to the side member and to the front of the return member, and (ii) providing a front surface of the temple arm.

14 Claims, 32 Drawing Sheets

(56) References Cited

U.S. PATENT DOCUMENTS

| | | |
|---|---|---|
| 2006/0250570 A1 | 11/2006 | Friedman |
| 2007/0091255 A1 | 4/2007 | Pilat |
| 2008/0304005 A1* | 12/2008 | DiChiara ............... 351/106 |
| 2010/0290000 A1 | 11/2010 | Krumme |
| 2011/0187987 A1 | 8/2011 | Zider |

FOREIGN PATENT DOCUMENTS

| | | |
|---|---|---|
| DE | U 9406002.9 | 10/1994 |
| DE | 10320270 | 7/2004 |
| EP | 0790519 | 8/1997 |
| FR | 2749088 | 11/1997 |
| FR | 2766586 | 1/1999 |
| JP | 11-183851 A | 7/1999 |
| KR | 20-0164601 Y1 | 2/2000 |
| KR | 20/021-7876 Y1 | 3/2001 |
| KR | 20-0376512 Y1 | 3/2005 |
| WO | WO 00/26715 | 5/2000 |
| WO | WO 02/095482 | 11/2002 |

OTHER PUBLICATIONS

Korean Patent Office Search Report and Opinion for PCT/US 2012/054524.

\* cited by examiner

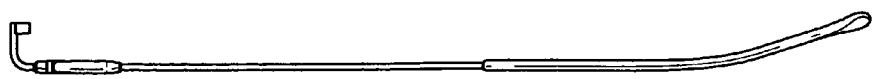
FIG. 4
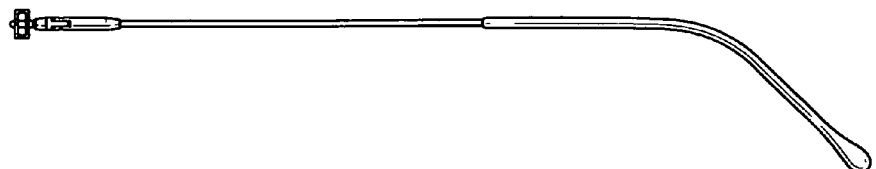
FIG. 5
 
FIG. 6    FIG. 7

FIG. 11
FIG. 12
 
FIG. 13  FIG. 14

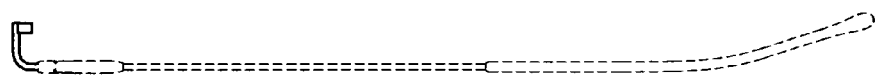
FIG. 18
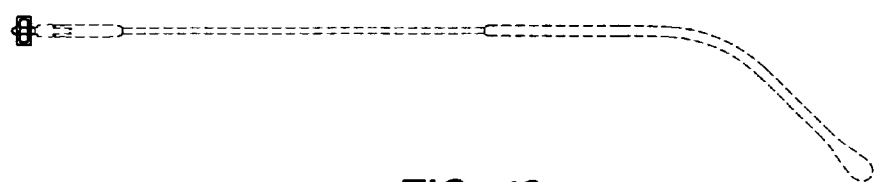
FIG. 19
 
FIG. 20　　　FIG. 21

EYEGLASS FRAMES

INTRODUCTION TO THE INVENTION

U.S. Pat. No. 6,164,775 discloses and claims an eyeglass lens attachment arrangement comprising an eyeglass frame and a pair of lenses, each of the lenses including at least one shaped engaging portion, the shaped engaging portion cooperating with an attachment member which attaches a respective one of the lenses to the eyeglass frame such that the lenses are removably attached to the frame.

BACKGROUND OF THE INVENTION

Field of the Invention

This invention relates to eyeglass frames.

International Publication WO 2007/044221 and the corresponding copending US national phase application disclose
  (1) that, in an eyeglass assembly, an engaging portion on an eyeglass lens can be maintained in contact with an eyeglass frame member by means of a removable bonding member (RBM) which
    (a) contacts the engaging portion and the frame member; and
    (b) under typical conditions of use of the assembly, maintains the engaging portion and the frame member in direct or indirect contact with each other; and
    (c) under selected atypical ambient conditions, undergoes a change which separates the engaging portion and the frame member, or permits the engaging portion and the frame member to be separated from each other by pulling them apart manually.

International Publication WO 2010/039176 and the corresponding copending US national phase application disclose that when contacting surfaces of (i) an engaging portion on an eyeglass lens and (ii) an eyeglass frame member are to be maintained in contact, improved results can be obtained by (A) providing (i) a passage which passes away from the contacting surface of the frame member, preferably to an exterior surface of the frame member, and/or (ii) a passage which passes away from the contacting surface of the engaging portion, preferably to an exterior surface of the engaging portion, (B) coating at least part of the contacting surfaces of one or both of the engaging portion of the lens and the frame member with a composition which is relatively soft when the contacting surfaces of the lens and the frame member are brought into contact, (C) bringing the contacting surfaces into contact in such a way that the composition is forced into the passage, (D) treating the composition so that it hardens (the treatment being for example exposure to ultraviolet or other radiation, or simply leaving the composition to harden at ambient temperature and pressure), thus providing a physical lock which helps to secure the lens and the frame member together.

U.S. Pat. Nos. 4,895,438, 4,896,955, 6,523,952 and 6,843,561 disclose improved eyeglass frames, some of which make use of a member composed of a shape-memory alloy (often hereinafter abbreviated to SMA) and/or a lens including a shaped engaging portion.

The entire disclosure of each of the U.S. Patents, the international publications and the corresponding US national phase applications referred to above is incorporated herein by reference for all purposes.

SUMMARY OF THE INVENTION

In the known eyeglass frames (also referred to a spectacle frames) which comprise a temple arm having a side arm and an attachment portion which is secured to an engaging portion on the periphery of a lens (for example as disclosed in U.S. Pat. No. 6,164,775 and International Application Nos. WO 2007/044221 and WO 2010/039176), the side arm is connected directly to the attachment portion so that loads and distorting forces exerted on the side arm are transmitted directly to the junction between the attachment portion and the engaging portion. I have discovered that improved performance can be obtained by connecting the side arm and the attachment portion through an auxiliary member which extends away from the lens. The improved performance can for example be improved vision for the wearer of the eyeglasses (often referred to herein as a pair of spectacles) and/or improved stability of the junction between the attachment portion of the frame member and the engaging portion of the lens. In addition to serving these functional purposes, the auxiliary member can provide valuable design features.

Where reference is made in this specification to the front, back, side, top or bottom of a component, or to a view from the front, back, side, top or bottom, the reference is to a component of a pair of spectacles, or to a pair of spectacles, when the spectacles are placed on a horizontal surface, with the lenses generally vertical and the temple pieces generally horizontal In a first aspect, this invention provides a temple arm for an eyeglass frame, the temple arm comprising.
  (1) a side member,
  (2) an auxiliary member, and
  (3) a return member which comprises an attachment portion for fitting to (preferably fitting around or into) an engaging portion on the periphery of a lens;
the auxiliary member (i) being connected to the side member and to the front of the return member, and (ii) providing a front surface of the temple arm.

In a second aspect, this invention provides a kit which comprises two temple arms according to the first aspect of the invention, the temple arms being mirror images of each other when viewed from the side, and which preferably also comprises a nose piece including two attachment portion for fitting to respective engaging portions on the peripheries of two lenses.

In a third aspect, this invention provides a pair of spectacles which comprises.
  (1) a pair of lenses, each lens having an engaging portion on its periphery, and
  (2) a pair of temple arms according to the first aspect of the invention, the attachment portions of the temple arms being fitted to respective engaging portions of the lenses.

I have also discovered, in a fourth aspect of the invention, a novel eyeglass frame which comprises two temple arms and a bar connecting the two temple arms, the bar carrying two spaced apart attachment portions for fitting to respective engaging portions on the peripheries of a pair of lenses.

In a fifth aspect, this invention provides a pair of spectacles which comprises.
  (1) a pair of lenses, each lens having an engaging portion on its periphery, for example, on the top surface of the lens, particularly near the center of the lens, and
  (2) a eyeglass frame according to the fourth aspect of the invention, the attachment portions on the bar of the eyeglass frame being fitted to respective engaging portions on the lenses.

In a sixth aspect, this invention provides a new design for a temple piece for a eyeglass frame as shown in FIGS. 1-7.

In a seventh aspect, this invention provides a new design for a temple piece for a eyeglass frame as shown in FIGS. 8-14, the portions of the design shown in phantom lines forming no part of the claimed design.

In an eighth aspect, this invention provides a new design for a temple piece for a eyeglass frame as shown in FIGS. 15-21, the portions of the design shown in phantom lines forming no part of the claimed design.

In a ninth aspect, this invention provides a new design for a pair of spectacles as shown in FIGS. 22-27.

In a tenth aspect, this invention provides a new design for a pair of spectacles as shown in FIGS. 28-33, the portions of the design shown in phantom lines forming no part of the claimed design.

In an eleventh aspect, this invention provides a new design for a pair of spectacles as shown in FIGS. 34-39, the portions of the design shown in phantom lines forming no part of the claimed design In a twelfth aspect, this invention provides a new design for a pair of spectacles as shown in FIGS. 40-45.

In a thirteenth aspect, this invention provides a new design for a pair of spectacles as shown in FIGS. 46-51, the portions of the design shown in phantom lines forming no part of the claimed design.

In a fourteenth aspect, this invention provides a new design for a pair of Spectacles as shown in FIGS. 52-57, the portions of the design shown in phantom lines forming no part of the claimed design

BRIEF DESCRIPTION OF THE DRAWINGS

The invention is illustrated in the accompanying drawings in which

FIGS. 1-7 are perspective, bottom, side, top, side, rear and front views of the new design for a temple piece according to the sixth aspect of the invention;

FIGS. 8-14 are perspective, bottom, side, top, side, rear and front views of the new design for a temple piece according to the seventh aspect of the invention;

FIGS. 15-21 are perspective, bottom, side, top, side, rear and front views of the new design for a temple piece according to the eighth aspect of the invention;

DETAILED DESCRIPTION OF THE INVENTION

Figure 1:
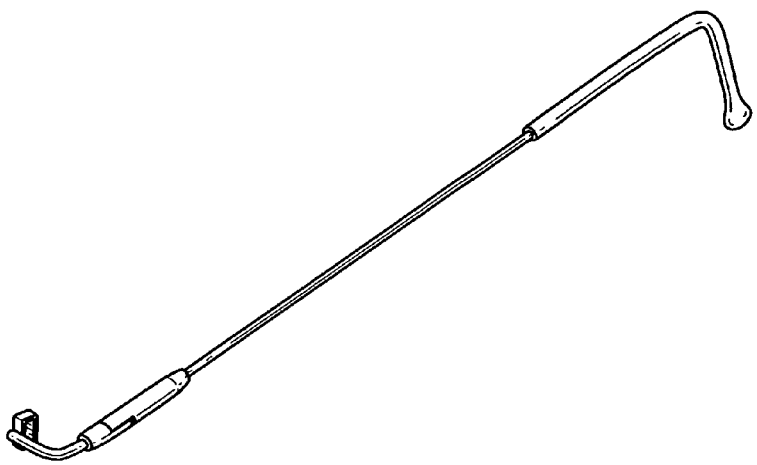
Figure 2:
Figure 3:
Figure 8:
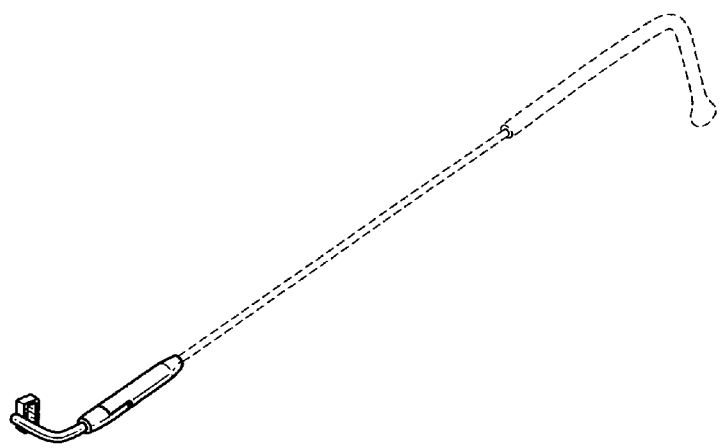
Figure 9:
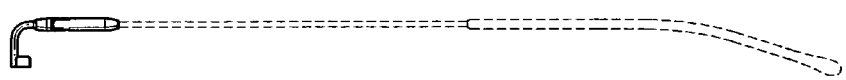
Figure 10:
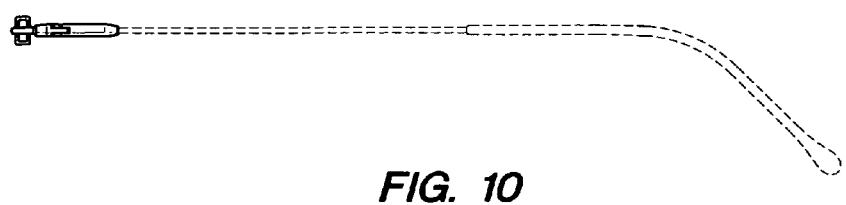
Figure 15:
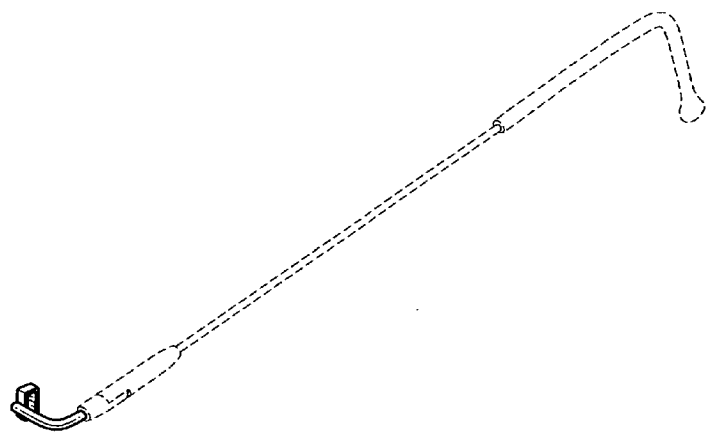
Figure 16:
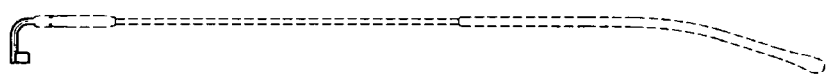
Figure 17:
Figure 22:
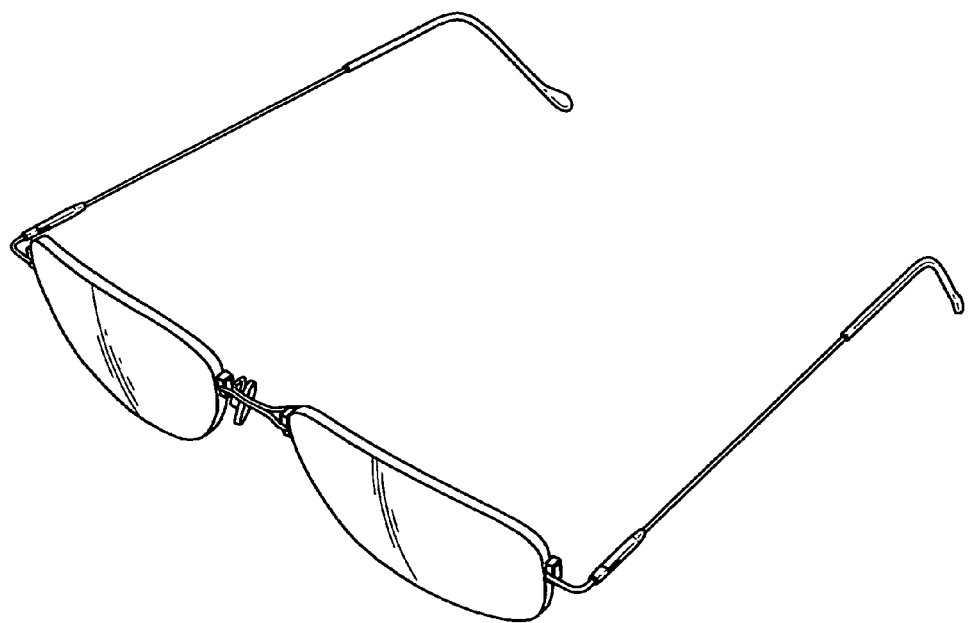
FIGS. 22-27 are perspective, front, side, rear, top and bottom views of the new design for a pair of spectacles according to the ninth aspect of the invention.
Figure 23:
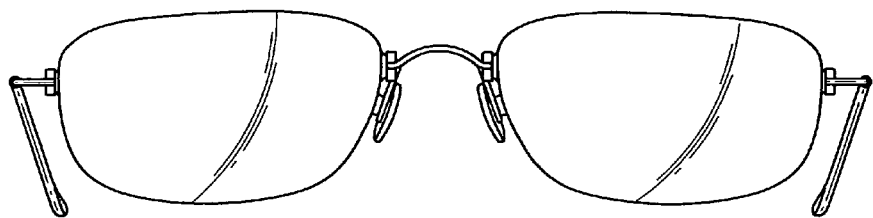
Figure 24:
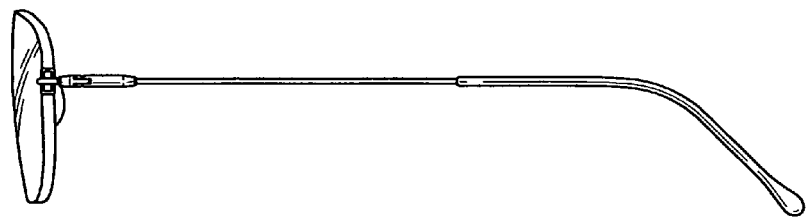
Figure 25:
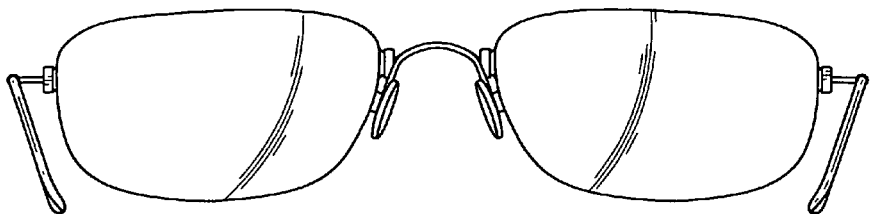
Figure 26:
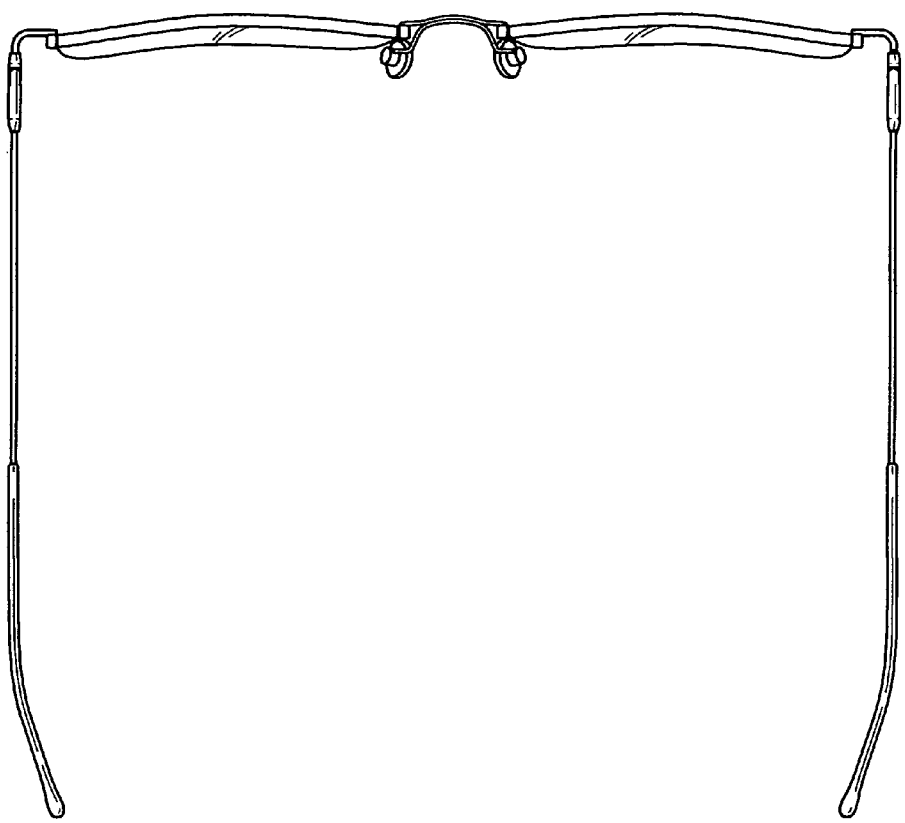
Figure 27:
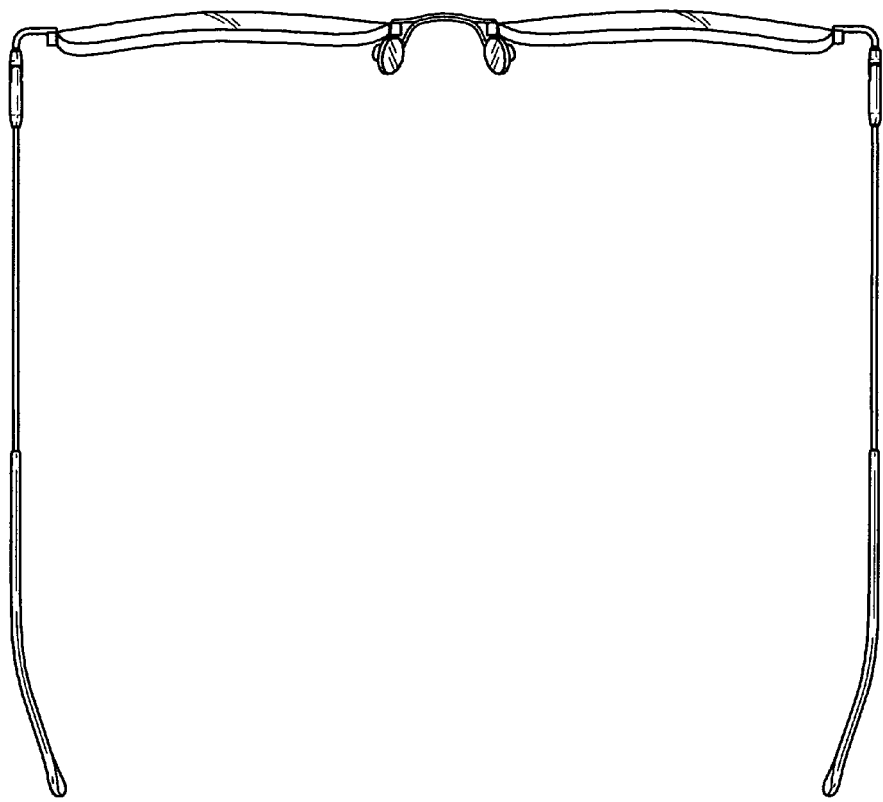
Figure 28:
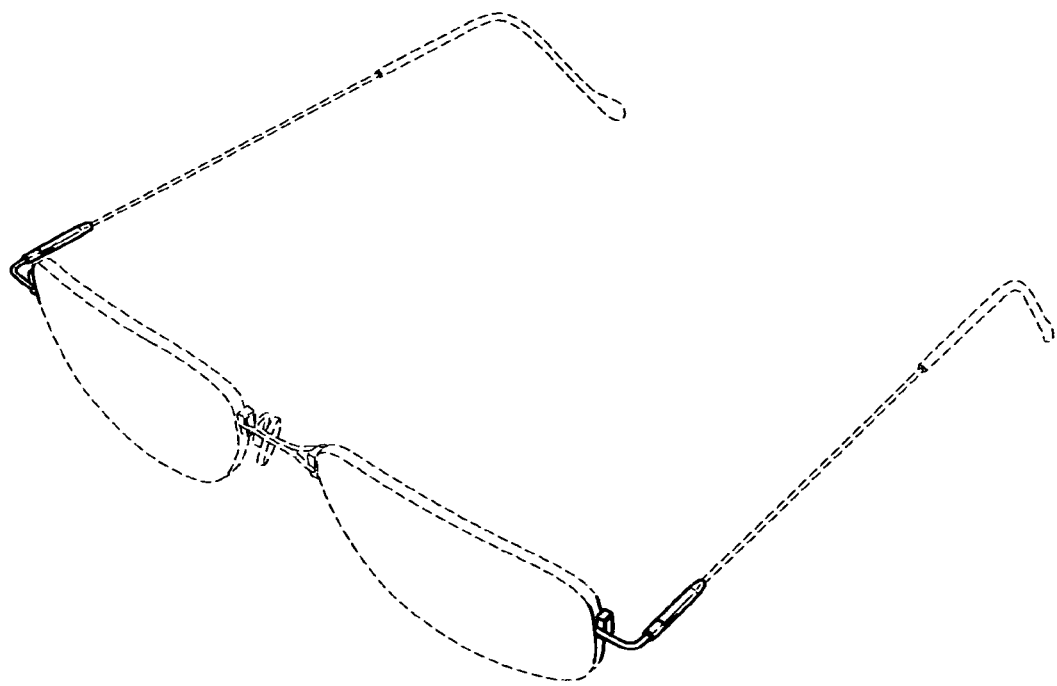
FIGS. 28-33 are perspective, front, side, rear, top and bottom views of the new design for a pair of spectacles according to the tenth aspect of the invention.
Figure 29:
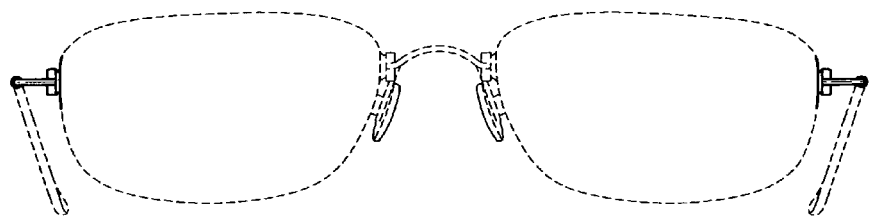
Figure 30:
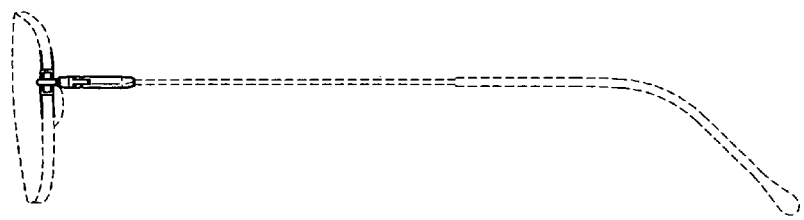
Figure 31:
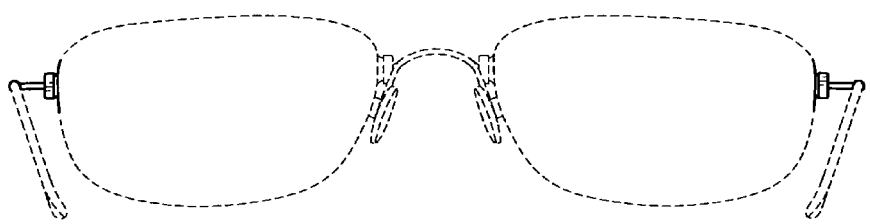
Figure 32:
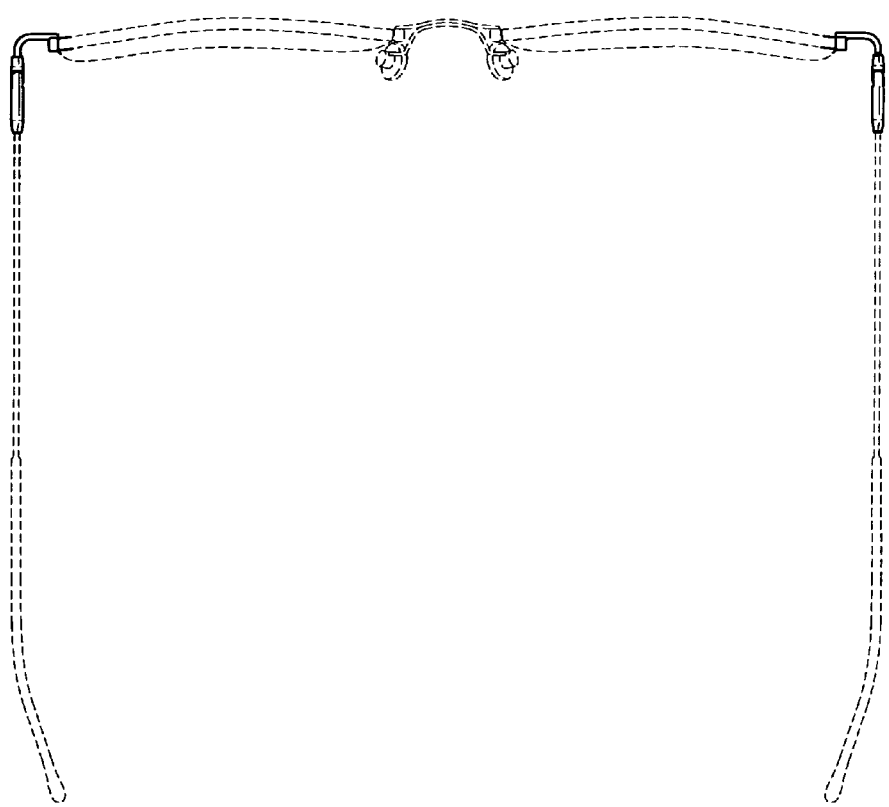
Figure 33:
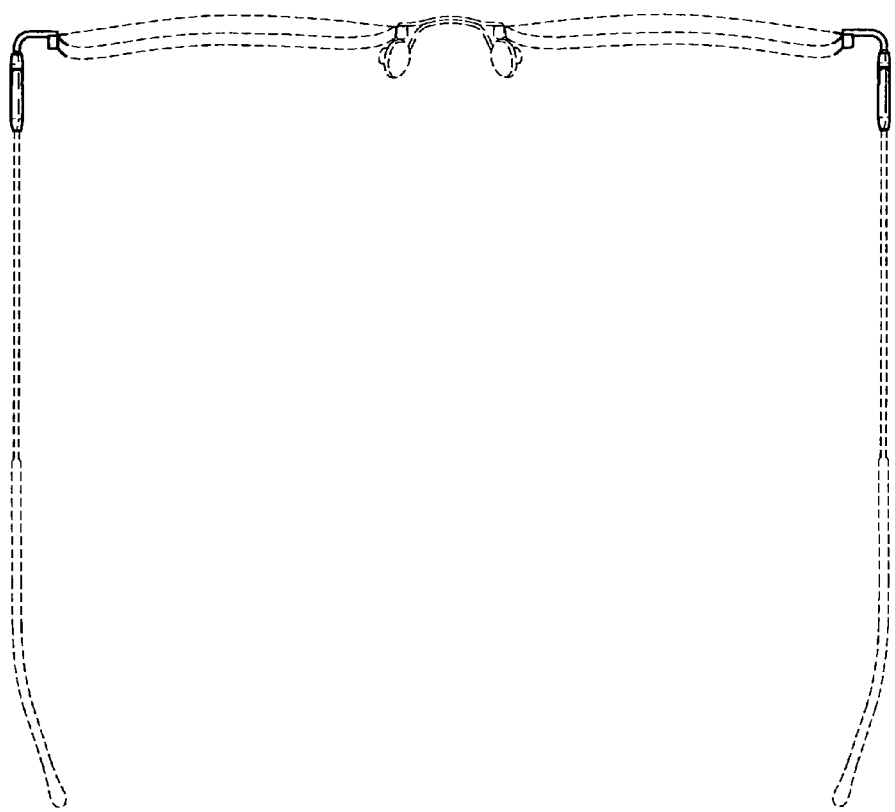
Figure 34:
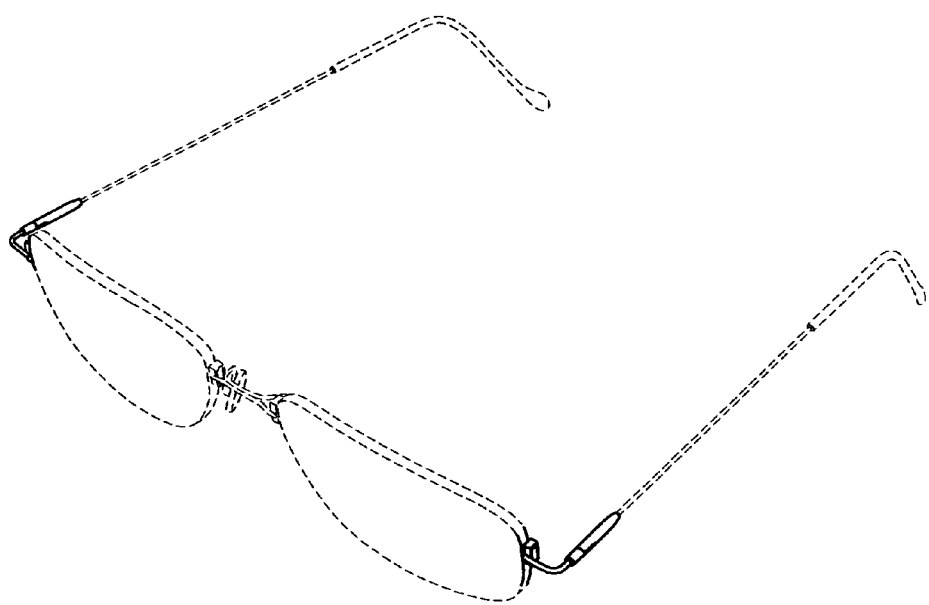
FIGS. 34-39 are perspective, front, side, rear, top and bottom views of the new design for a pair of spectacles according to the eleventh aspect of the invention.
Figure 35:
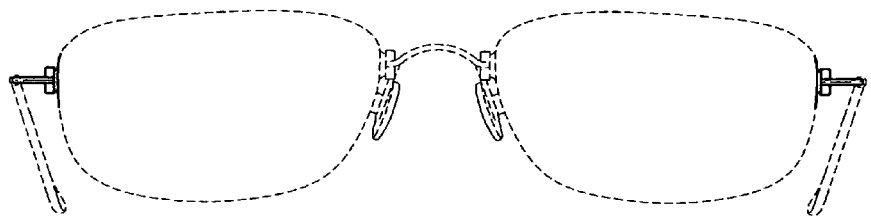
Figure 36:
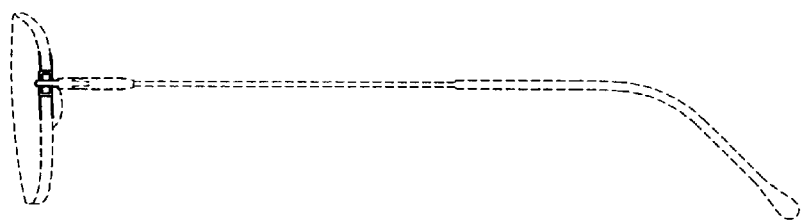
Figure 37:
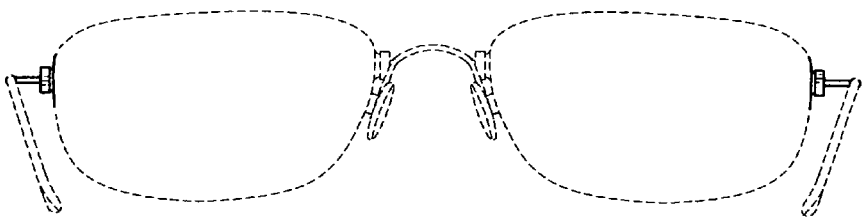
Figure 38:
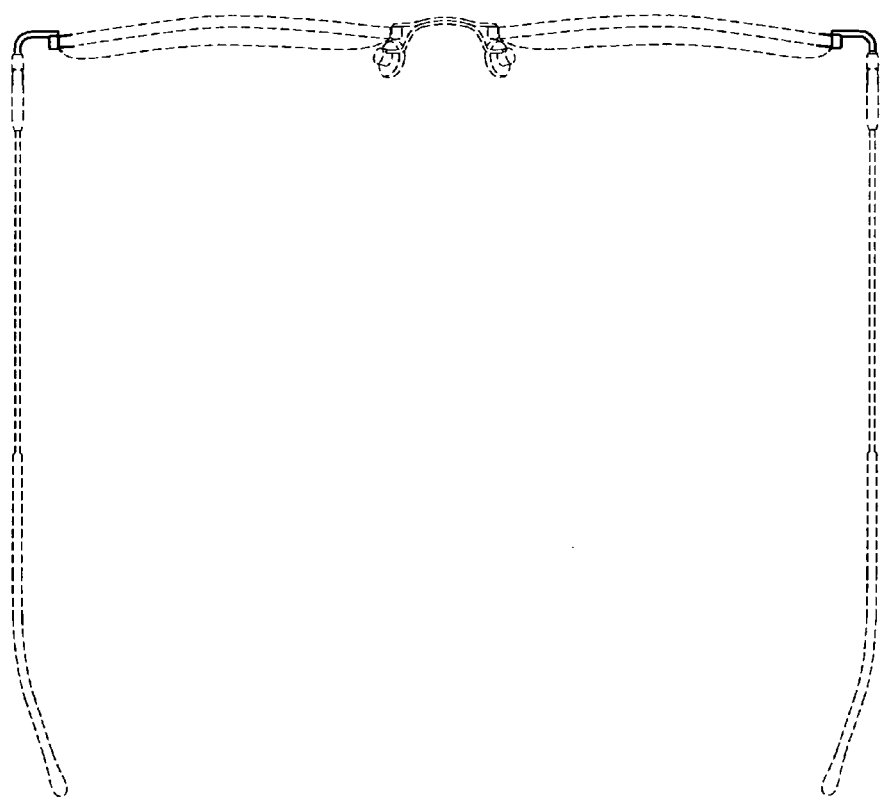
Figure 39:
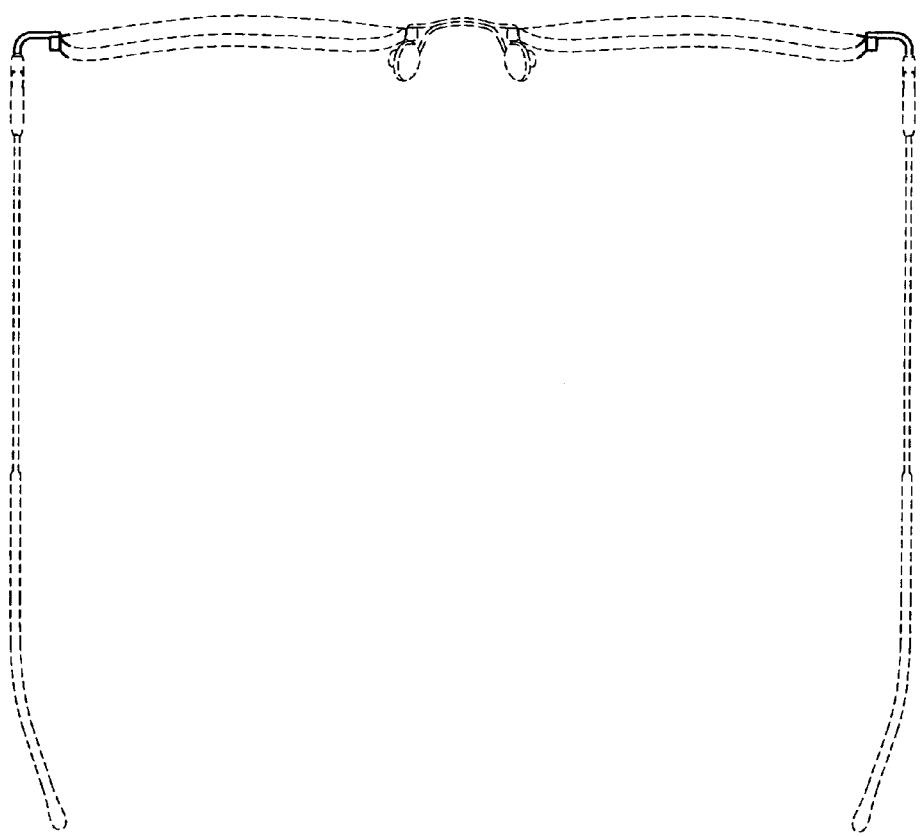
Figure 40:
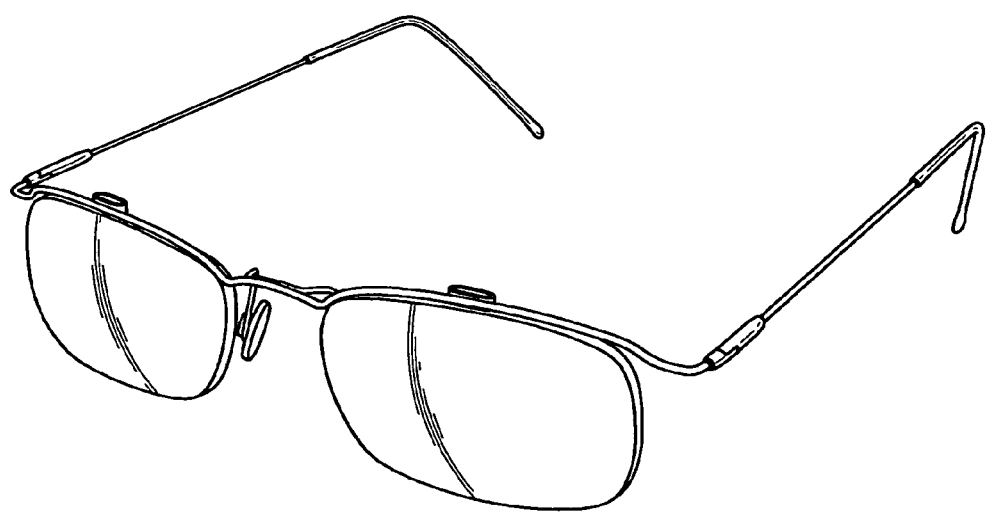
FIGS. 40-45 are perspective, front, side, rear, top and bottom views of the new design for a pair of spectacles according to the twelfth aspect of the invention.
Figure 41:
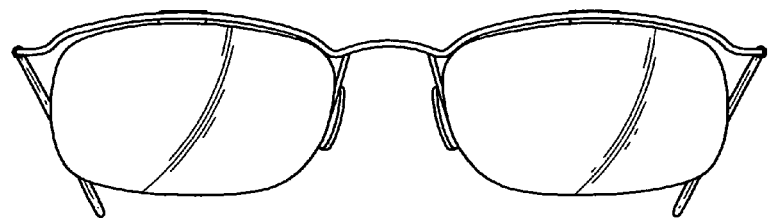
Figure 42:
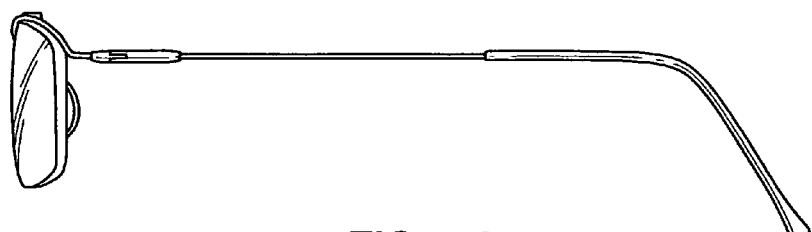
Figure 43:
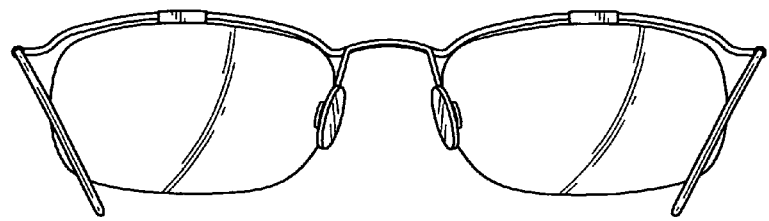
Figure 44:
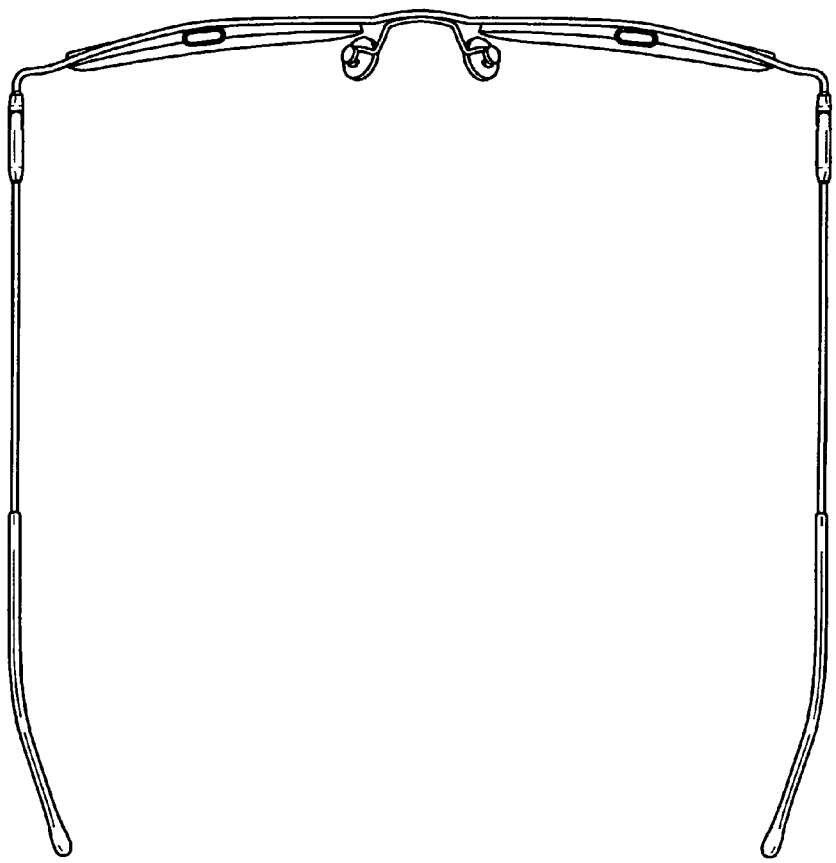
Figure 45:
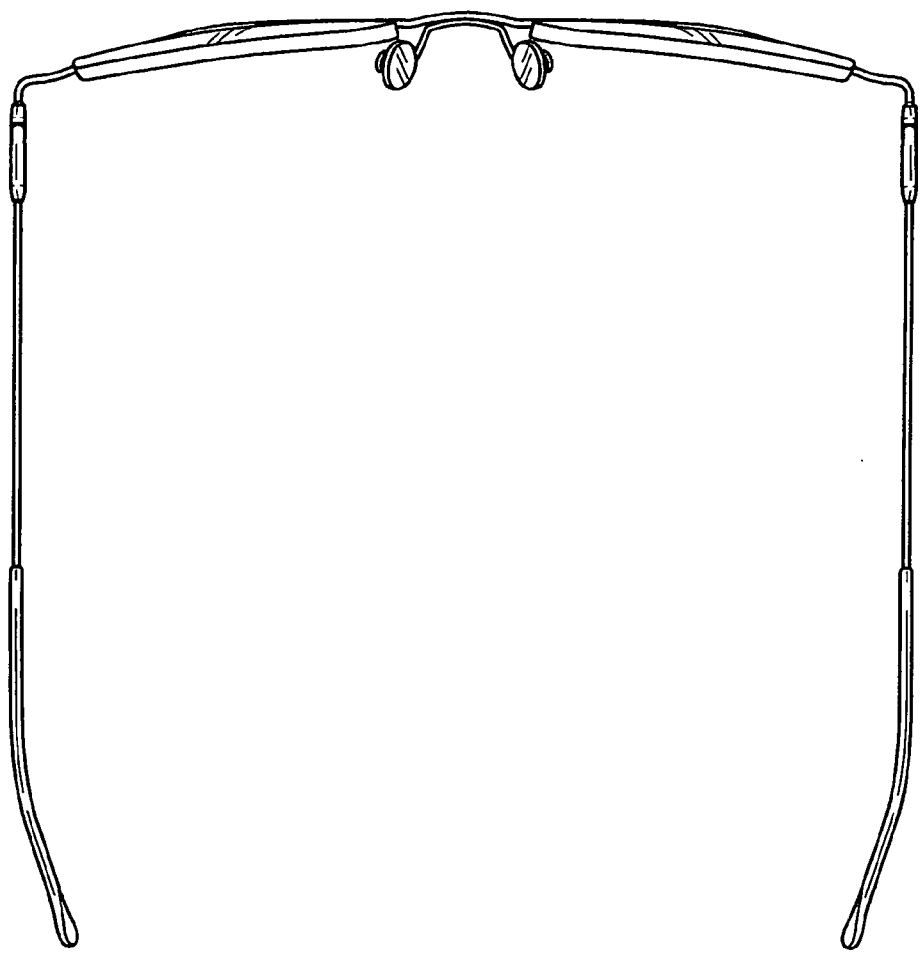
Figure 46:
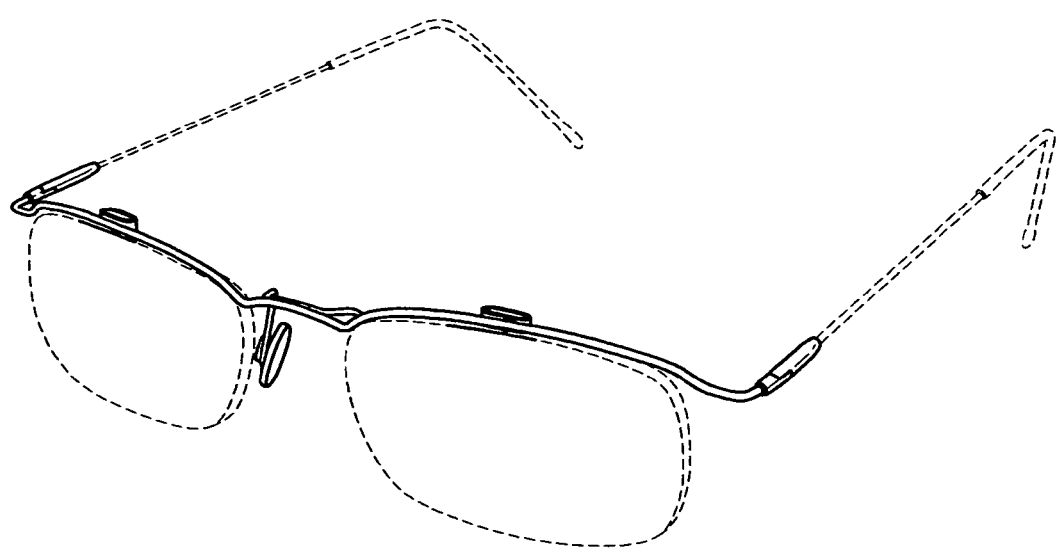
FIGS. 46-51 are perspective, front, side, rear, top and bottom views of the new design for a pair of spectacles according to the thirteenth aspect of the invention.
Figure 47:
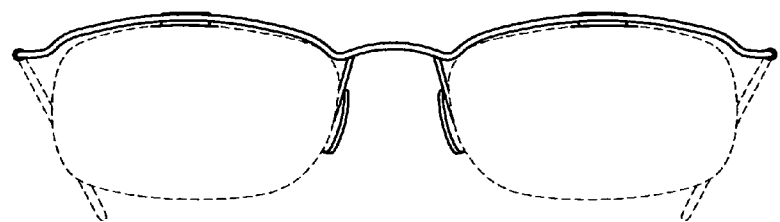
Figure 48:
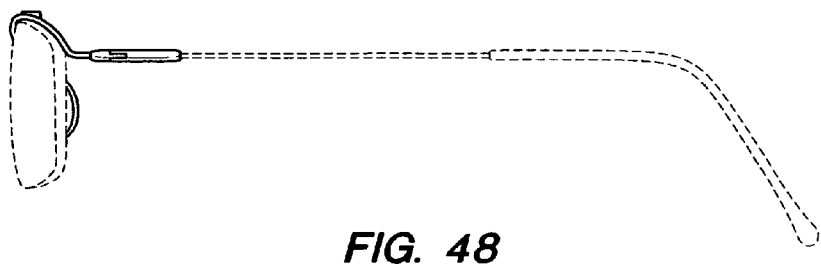
Figure 49:
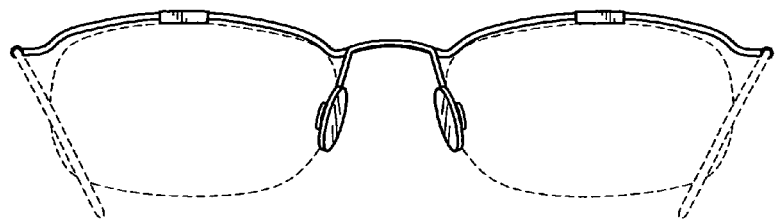
Figure 50:
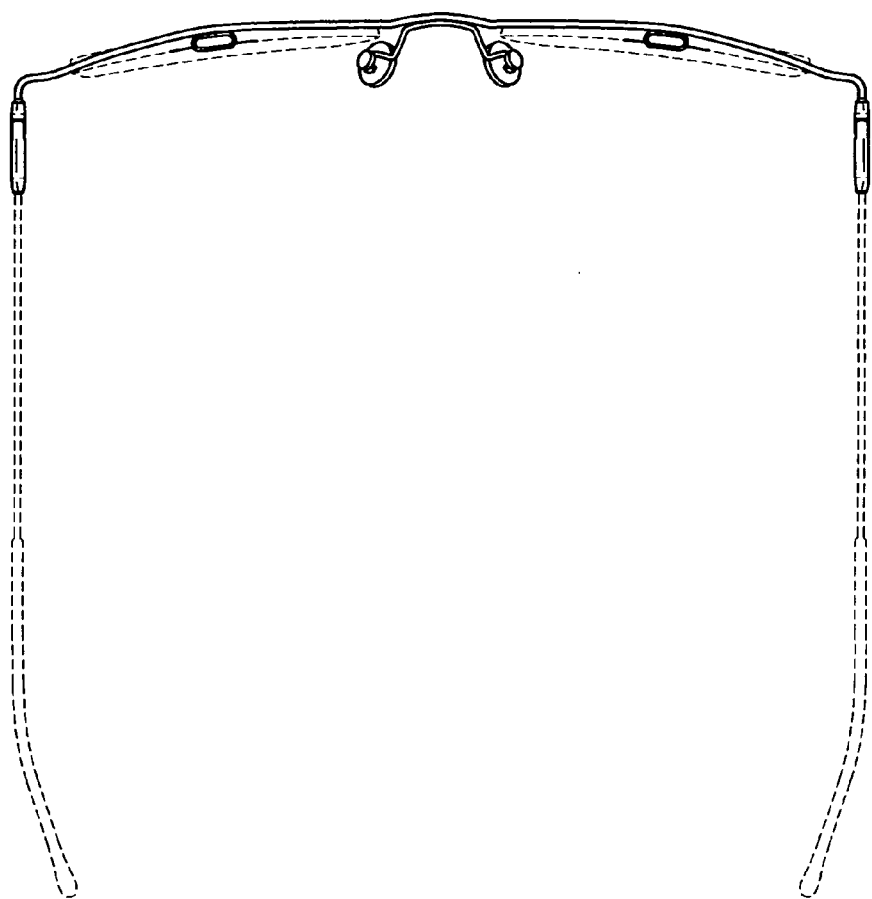
Figure 51:
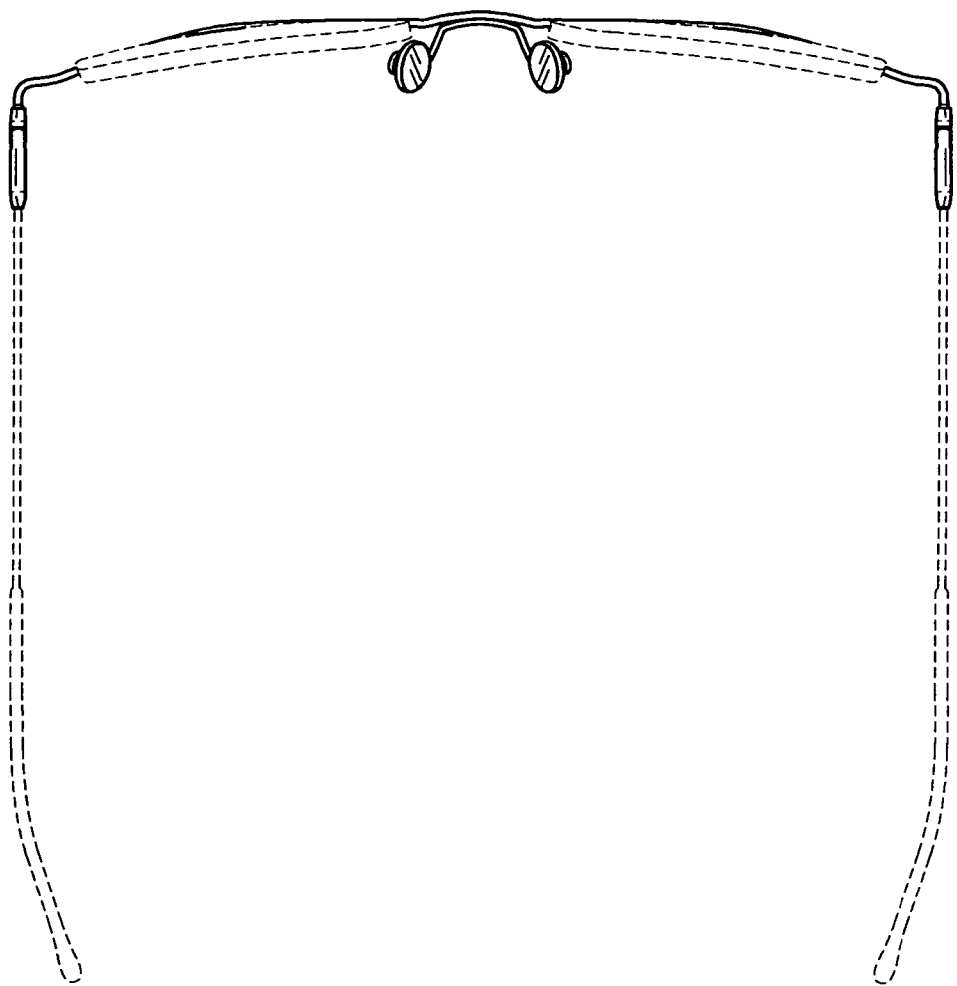
Figure 52:
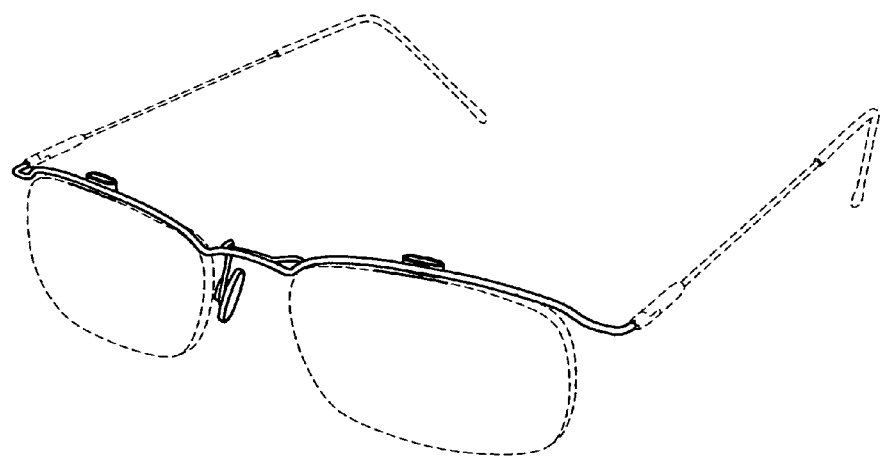
FIGS. 52-57 are perspective, front, side, rear, top and bottom views of the new design for a pair of spectacles according to the fourteenth aspect of the invention.
Figure 53:
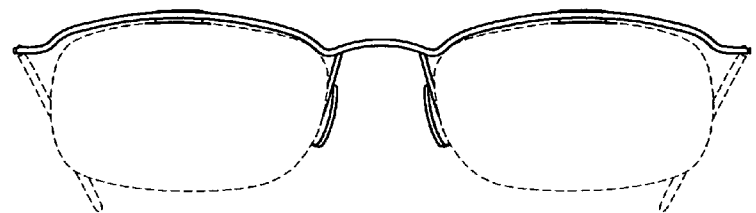
Figure 54:
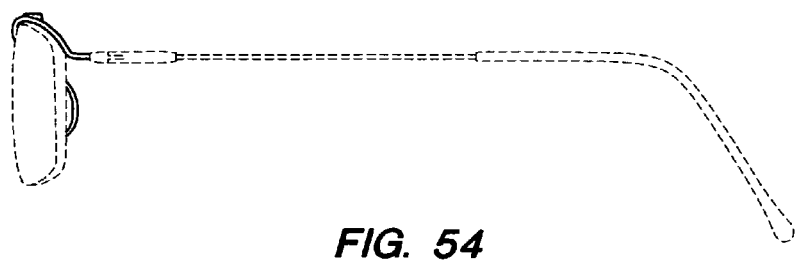
Figure 55:
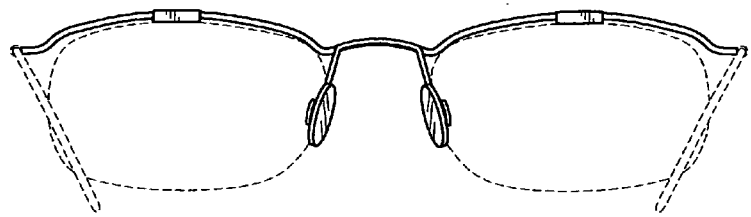
Figure 56:
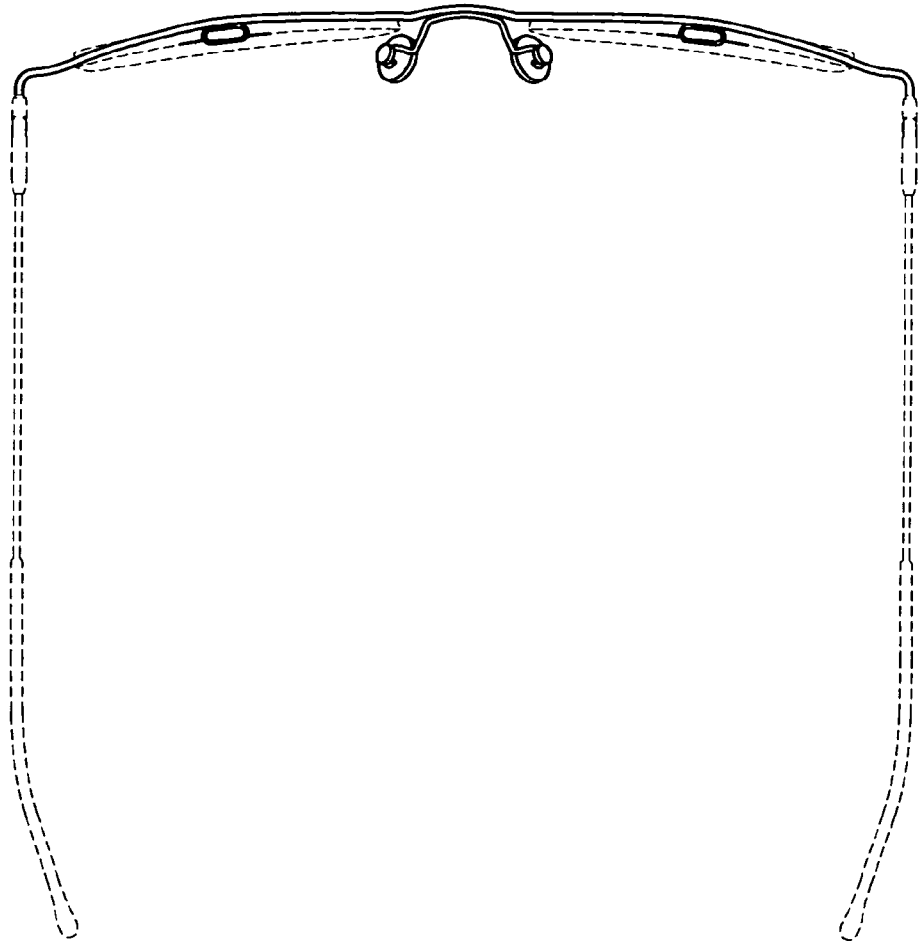
Figure 57:
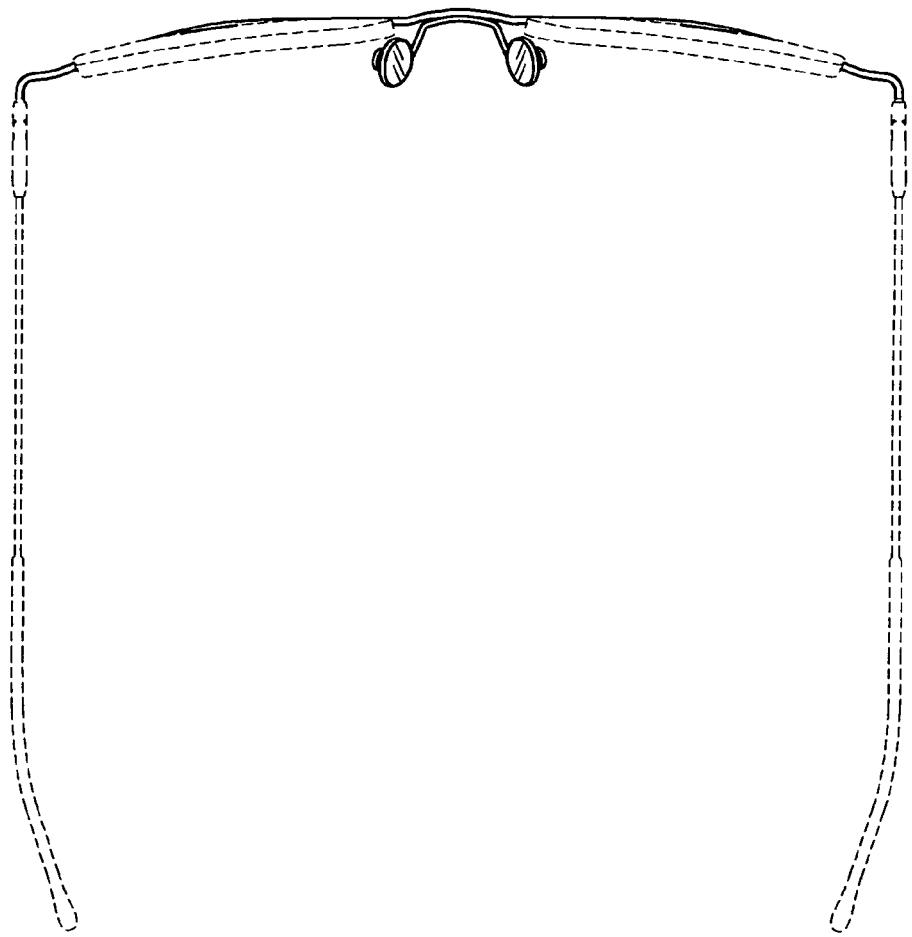

In the Summary of the Invention above, the Detailed Description of the Invention below, and the accompanying drawings, reference is made to particular aspects and features (including for example components, ingredients, devices, apparatus, systems, groups, ranges, method steps, test results, etc.) of the invention. It is to be understood that the disclosure of the invention in this specification includes all possible combinations of such particular features. For example, where a particular feature is disclosed in the context of a particular aspect, a particular embodiment, a particular claim, or a particular Figure, that feature can also be used, to the extent appropriate, in the context of other particular aspects, embodiments, claims and Figures, and in the invention generally. The invention disclosed herein includes embodiments not specifically described herein and can for example make use of features which are not specifically described herein, but which provide functions which are the same, equivalent or similar to, features specifically disclosed herein.

The term "comprises" and grammatical equivalents thereof are used herein to mean that, in addition to the features specifically identified, other features are optionally present. For example, an apparatus " comprising" (or "which comprises") components A, B and C can contain only components A, B and C, or can contain not only components A, B and C but also one or more other components. The term "consisting essentially of and grammatical equivalents thereof is used herein to mean that, in addition to the features specifically identified, other features may be present which do not materially alter the claimed invention. The term "at least" followed by a number is used herein to denote the start of a range beginning with that number (which may be a range having an upper limit or no upper limit, depending on the variable being defined). For example "at least 1" means 1 or more than 1, and "at least 80%" means 80% or more than 80%. The term "at most" followed by a number is used herein to denote the end of a range ending with that number (which may be a range having 1 or 0 as its lower limit, or a range having no lower limit, depending upon the variable being defined). For example, "at most 4" means 4 or less than 4, and "at most 40%" means 40% or less than 40%. When, in this specification, a range is given as " (a first number) to (a second number)" or "(a first number)-(a second number)", this means a range whose lower limit is the first number and whose upper limit is the second number. For example, "from 8 to 20 inches" or "8-20 inches" means a range whose lower limit is 8 inches, and whose upper limit is 20 inches. The terms "plural", "multiple", "plurality" and "multiplicity" are used herein to denote two or more than two features.

Where reference is made herein to "a" or "an" feature, this includes the possibility that there are two or more such features (except where the context excludes that possibility). Where reference is made herein to two or more features, this includes the possibility that the two or more features are replaced by a lesser number or greater number of features providing the same function (except where the context excludes that possibility). The numbers given herein should be construed with the latitude appropriate to their context and expression; for example, each number is subject to variation which depends on the accuracy with which it can be measured by methods conventionally used by those skilled in the art.

This specification incorporates by reference all documents referred to herein and all documents filed concurrently with this specification or filed previously in connection with this application, including but not limited to such documents which are open to public inspection with this specification.

The following features are optionally present in the various aspects of the invention. Two or more of the features may be used in combination, where they are not mutually exclusive.

(1) The auxiliary member has a length, viewed from the front, of at least 0.2 inch (5 mm), preferably at least 0.25 inch (6.3 mm).
(2) The auxiliary member has a length, viewed from the front, of at most 0.7 inch (18 mm), preferably at most 0.5 inch (13 mm).
(3) The auxiliary member has a length, viewed from the front, of 0.2 to 0.5 inch (5 to 13 mm), preferably 0.25 to 0.4 inch (6.3 to 10 mm), for example 0.27 to 0.35 (7 to 9 mm).
(4) The auxiliary member has a length, viewed from above, of at least 0.2 inch (5 mm), preferably at least 0.25 inch (6.3 mm).
(5) The auxiliary member has a length, viewed from above, of at most 0.7 inch (18 mm), preferably at most 0.5 inch (13 mm).
(6) The auxiliary member has a length, viewed from above, of 0.2 to 0.5 inch (5 to 13 mm), preferably 0.25 to 0.4 inch (6.3 to 10 mm), for example 0.27 to 0.35 (7 to 9 mm).
(7) The length of the auxiliary member, viewed from the front, is 0.5 to 1.5 times, preferably 0.8 to 1.2 times, particularly 0.9 to 1.1 times, especially about 1.0 times, the length of the auxiliary member, viewed from above.
(8) The auxiliary member, viewed from above, lies in a plane which is at an angle of at most 20°, preferably at most 10°, to the plane of the lens, particularly in a plane which is parallel to the plane of the lens.
(9) At least part of the front surface of the auxiliary member, viewed from above, is in front of the front surface of the lens at the junction of the attachment portion and the engaging portion.
(10) The auxiliary member and the foremost section of the side member are monolithic, for example through a curved section, such that the auxiliary member and the foremost section are substantially at right angles to each other.
(11) The return member consists essentially of the attachment portion.
(12) The return member is secured to the auxiliary member, having been prepared separately from the auxiliary member.
(13) The return member and the auxiliary member are monolithic.
(14) The side arm comprises a hinge, for example a spring hinge.
(15) The temple arm does not cross the periphery of the lens.
(16) The junction between attachment portion and the engaging portion is the sole means securing the temple arm to the lens.
(17) The engaging portion of the lens extends outwards from the periphery of the lens, and the attachment portion fits over the engaging portion.
(18) The engaging portion of the lens extends from the periphery of the lens into the thickness of the lens, and the attachment portion fits into the engaging portion.
(19) There is an adhesive between the engaging portion and the attachment portion, preferably an adhesive which can be removed by heating without damaging the lens or the temple arm.
(20) There is an adhesive between the engaging portion and the attachment portion, the adhesive being the sole means of securing the engaging portion to the attachment portion.
(21) At least part of the auxiliary member has a cross-sectional area of 0.03 to 1.0 mm$^2$, e.g. 0.04 to 0.5 mm$^2$ or 0.04 to 0.2 mm$^2$.
(22) The auxiliary member comprises a straight section, and a smoothly curved section which is joined to the side member.

Figure 58:
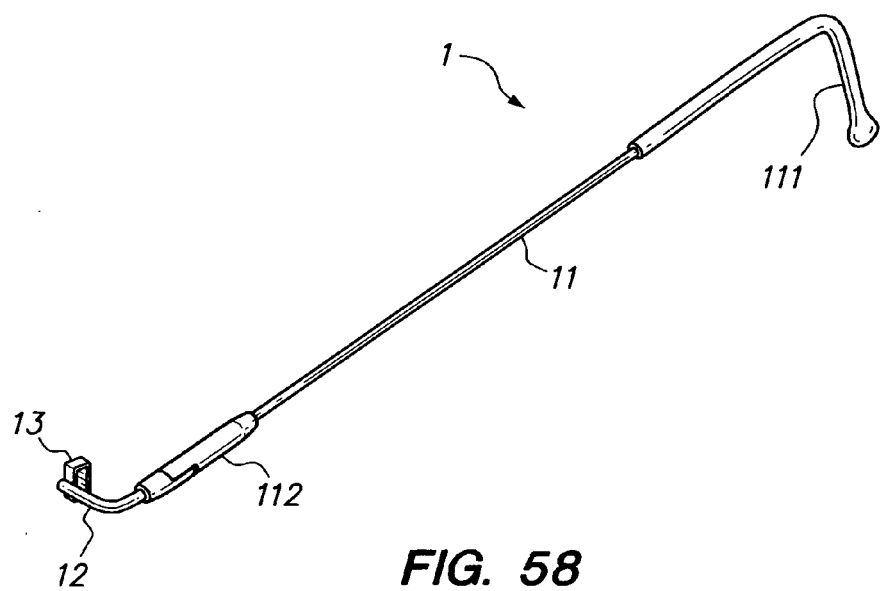
FIGS. 58, 59 and 60 are perspective, top and side views of a temple arm according to the first aspect of the invention.
Figure 59:
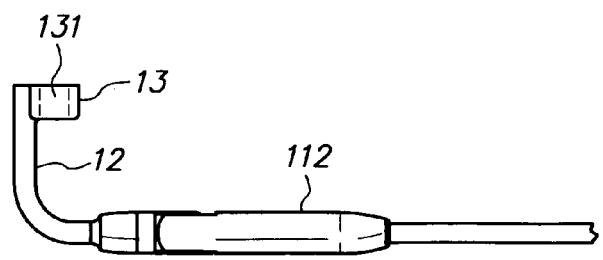
Figure 60:
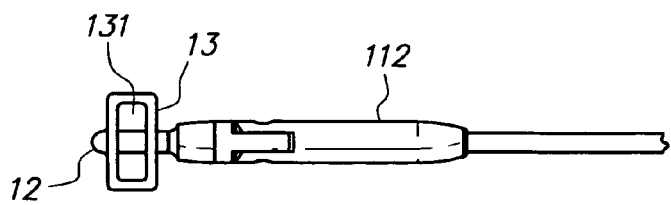
Figure 61:
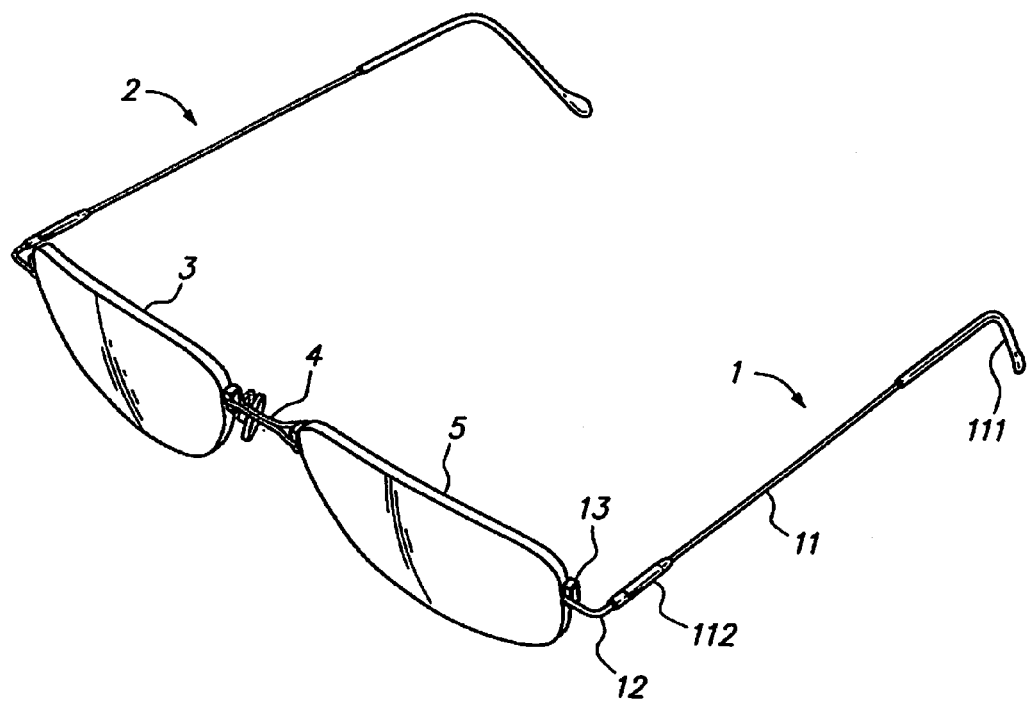
FIG. 61 is a perspective view of a pair of spectacles according to the third aspect of the invention.
Figure 62:
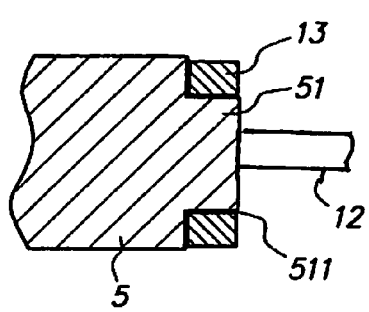
FIG. 62 is an enlarged cross-sectional view of the junction between the lens and the engaging portion in FIG. 61, viewed from behind the lens and at right angles to the plane of the lens.
Figure 63:
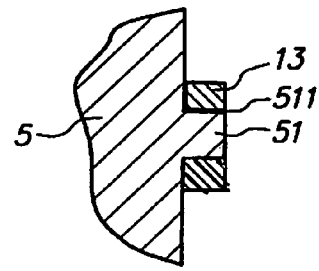
FIG. 63 is an enlarged cross-sectional view of the junction between the lens and the engaging portion in FIG. 61, in the plane of the lens.

FIGS. 58-60 show a temple arm 1 according to the first aspect of the invention. The temple arm comprises a side member 11 which includes an earpiece 111 and a hinge 112; an auxiliary member 12; and a return member 13. The return member 13 consists essentially of an attachment member having an orifice 131 for fitting to an engaging portion on the periphery of a lens. The return member optionally includes a short section (not shown) which lies between the auxiliary member and the attachment member, and generally at right angles to the auxiliary member. FIG. 61 shows a pair of spectacles comprising temple arms 1 and 2, which are mirror images of each other; lenses 3 and 5; and nose piece 4 which joins the two lenses. As shown in the cross-sections of FIGS. 62 and 63, the temple arm 1 is secured to the lens 5 through engaging portion 51 which protrudes from the periphery of the lens, and which fits into the orifice 131 of the attachment member 13. A layer of adhesive 511 secures the engaging portion and the attachment member to each other. The temple arm 2 is similarly secured to the lens 4. Nose piece 4 is similarly secured to the lenses 3 and 5.

The invention claimed is:

1. A temple arm for an eyeglass frame, the temple arm comprising
   (1) a side member,
   (2) an auxiliary member which comprises a straight section,
   (3) a return member which (i) comprises an attachment portion including an orifice for fitting to an engaging portion of a lens, and (ii) is generally at right angles to the auxiliary member, and
   (4) a curved section which joins the auxiliary member and a foremost section of the side member so that the straight section of the auxiliary member and the foremost section of the side member are substantially at right angles to each other, the curved section and the auxiliary member being monolithic;
the auxiliary member
   (i) being connected to the side member and to the front of the return member,
   (ii) having a length, viewed from the front, of at least 0.2 inch and at most 0.7 inch,
   (iii) having a length, viewed from above, of at least 0.2 inch and at most 0.7 inch, and
   (iv) providing a front surface of the temple arm; and
the side member and the return member extending backwards from the auxiliary member.

2. A kit which comprises two temple arms according to claim 1, the temple arms being mirror images of each other when viewed from the side, and a nose piece including two attachment members for fitting to respective engaging portions of two lenses.

3. A pair of spectacles which comprises;
   (A) a pair of temple arms according to claims 1,
   (B) a pair of lenses, each lens having a front surface and a periphery and an engaging portion on the periphery of the lens, the attachment portions of the temple arms being fitted to respective engaging portions of the lenses at respective junctions;

each of the auxiliary members, when viewed from above, providing a front surface of the temple arm of which it is a part, at least part of the front surface being in front of the front surface of the lens at the junction of the attachment portion and the engaging portion.

4. A pair of spectacles according to claim 3 wherein the engaging portion on each lens extends outwards from the periphery of the lens.

5. A pair of spectacles according to claim 3 wherein each of the auxiliary members, viewed from above, lies in a plane which is parallel to the plane of the lens.

6. A pair of spectacles according to claim 3 wherein each of the auxiliary members has a length, viewed from the fronl, of 0.2 to 0.5 inch and a length, viewed from above, of 0.2 to 0.5 inch.

7. A pair of spectacles according to claim 3 wherein, in each of the temple arms, the return member consists essentially of the attachment portion.

8. A pair of spectacles according to claim 3 wherein, in each of the temple arms, the return member and the auxiliary member are monolithic.

9. A pair of spectacles according to claim 3 wherein, in each of the temple arms, the return member is secured to the auxiliary member and was prepared separately from the auxiliary member.

10. A pair of spectacles which comprises for
(A) a pair of temple arms, each of the temple arms comprising
   (1) a side member,
   (2) an auxiliary member which comprises a straight section,
   (3) a return member which (i) comprises an attachment portion including an orifice for fitting to an engaging portion of a lens, and (ii) is generally at right angles to the auxiliary member, and
   (4) a curved section which joins the auxiliary member and a foremost
   section of the side member so that the straight section of the auxiliary
   member and the foremost section of the side member are substantially at
   right angles to each other, the curved section and the auxiliary member
   being monolithic;
the auxiliary member
   (i) being connected to the side member and to the front of the return member,
   (ii) having a length, viewed from the front, of 0.2 to 0.5 inch,
   (iii) having a length, viewed from above, of 0.2 to 0.5 inch, and
   (iv) providing a front surface of the temple arm; and
the side member and the return member extending backwards from the auxiliary member; and
(B) a pair of lenses, each lens having (i) a front surface, (ii) a rear surface, (iii) a plane which lies between the front surface and the rear surface, (iv) a periphery, and (v) an engaging portion which extends from the periphery of the lens,
the attachment portions of the temple arms being fitted to respective engaging portions of the lenses at respective junctions; and each of the auxiliary members, when viewed from above,
   (i) lying in a plane which is parallel to the plane of the lens,
   (ii) having a front surface which is in front of the front surface of the lens at the junction of the attachment portion and the engaging portion.

11. A pair of spectacles according to claim 10 wherein, in each of the temple arms, the return member consists essentially of the attachment portion.

12. A pair of spectacles according to claim 10 wherein, in each of the temple arms, the return member and the auxiliary member are monolithic.

13. A pair of spectacles according to claim 10 wherein, in each of the temple arms, the return member is secured to the auxiliary member and was prepared separately from the auxiliary member.

14. A pair of spectacles according to claim 10 wherein each engaging portion is secured to the respective attachment portion by an adhesive which can be removed by heating without damaging the lens or the temple arm.

* * * * *